(12) United States Patent
Kang et al.

(10) Patent No.: US 11,497,339 B2
(45) Date of Patent: Nov. 15, 2022

(54) COOKING APPLIANCE

(71) Applicant: LG ELECTRONICS INC., Seoul (KR)

(72) Inventors: Chung Kang, Seoul (KR); Hyeyoung Mun, Seoul (KR); Dae Yong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 677 days.

(21) Appl. No.: 16/519,076

(22) Filed: Jul. 23, 2019

(65) Prior Publication Data

US 2020/0029721 A1    Jan. 30, 2020

(30) Foreign Application Priority Data

Jul. 26, 2018 (KR) .......................... 10-2018-0087444

(51) Int. Cl.
| | |
|---|---|
| *A47J 27/04* | (2006.01) |
| *A21B 3/04* | (2006.01) |
| *A47J 36/00* | (2006.01) |
| *F24C 15/32* | (2006.01) |

(52) U.S. Cl.
CPC .............. *A47J 27/04* (2013.01); *A21B 3/04* (2013.01); *A47J 36/00* (2013.01); *F24C 15/327* (2013.01); *A47J 2027/043* (2013.01)

(58) Field of Classification Search
CPC ............................................... G06F 1/185–188
See application file for complete search history.

(56) References Cited

FOREIGN PATENT DOCUMENTS

| | | |
|---|---|---|
| CN | 206910212 | 1/2018 |
| EP | 0 276 458 | 8/1988 |
| EP | 2 518 413 | 10/2012 |
| FR | 2 958 726 | 10/2011 |
| KR | 10-2018-0028642 | 3/2018 |
| KR | 10-1859320 | 5/2018 |

OTHER PUBLICATIONS

European Search Report dated Nov. 28, 2019.
Korean Office Action issued in Application No. 10-2018-0087444 dated Jun. 17, 2022.

*Primary Examiner* — Jason Lau
(74) *Attorney, Agent, or Firm* — Ked & Associates

(57) ABSTRACT

A cooking appliance is provided. The cooking appliance may include a guide that regulates an installation position of a water supply device with respect to a front panel. The guide may include a first guide coupled to the water supply device to align a relative position of a front surface of the water supply device with respect to the front panel, a second guide coupled to a guide protrusion to align a relative position of the guide with respect to an opening; and a fixer that fixes the guide to the cavity.

20 Claims, 19 Drawing Sheets

COOKING APPLIANCE

CROSS-REFERENCE TO RELATED APPLICATION(S)

This application claims priority to and the benefit of Korean Patent Application No. 10-2018-0087444, filed in Korea on Jul. 26, 2018, the disclosure of which is incorporated herein by reference in its entirety.

BACKGROUND

1. Field

A cooking appliance, and more particularly, a cooking appliance having a steam supply device that supplies steam to a cooking chamber of an oven is disclosed herein.

2. Background

Cooking appliances may be used to cook food and may be installed in a kitchen space to cook food according to a user's intention. The cooking appliances may be classified in various ways according to, for example, heat sources used therein, forms thereof, and types of fuel.

In classification according to the forms in which food is cooked, cooking appliances may be classified as an open type cooking appliance and a closed type cooking appliance according to the form of space in which food is placed. Examples of the closed type cooking appliances may include an oven, a microwave, and the like, and examples of the open cooking appliances may include a cooktop, a hob, and the like.

The closed type cooking appliances may include a space that is configured to receive food and that is closed, and the closed space may be heated to cook food. The closed type cooking appliances may include a cooking chamber, which is a space being sealed when food placed therein is attempted to be cooked. The cooking chamber may be a space in which food is substantially cooked.

The above closed type cooking appliance may be divided broadly into a gas oven and an electric oven depending on a type of heat source. The gas oven may use a method in which gas is used as a fuel and it is ignited by supplying the gas to a plurality of burners, and food is cooked by flame generated as the supplied gas is burned. The electric oven, unlike the gas oven, may use a method in which a plurality of heaters are operated using electricity as a heat source, and the food is cooked by the heat emitted from the heaters.

Electric ovens may be faster than gas ovens in a speed of cooking and may have high thermal efficiency, and may have good stability, and the use of electric ovens is increasing.

Such an electric oven may further provide a function for cooking food using high frequency by adding electric parts that emit the high frequency, such as magnetron, so that various types of food may be cooked, or for cooking food using a heat emitted by a heater and high frequency emitted by the electric parts such as the magnetron.

Recently, a steam oven that cooks food using high-temperature steam has been released. The steam oven may have a function for injecting steam into the cooking chamber using the high-temperature steam and controlling humidity based on an amount of steam. The steam oven may provide multiple functions, for example, for preventing the food from being dried and performing cooking a large amount of food with multi-steps, as well as preventing taste from being degraded and flavor from being evaporated to maintain the taste and the flavor of the food.

In general, the steam oven may include a cabinet and defines an appearance, a cavity that is disposed inside of the cabinet to define a cooking chamber, a door opens that opens and closes a front opening of the cooking chamber, and a Steam generator that supplies steam to an inside of the cooking chamber.

Further, the Steam generator may include a steam generator that generates steam and a water supplier that supplies water to the steam generator. Between the water supply device and the steam generator, a water supply pipe may be connected so that water in the water tank may be moved to the steam generator. The steam generator may include a water storage in which water supplied by a water supply device is accommodated, and a heater that generates steam by heating water in the water storage.

In the above-described steam oven, the water injected through the water supply device may flow into the water storage through the water supply pipe, and the water introduced into the water storage may be heated by the heater to generate the steam, and the generated steam may be introduced into the cooking chamber and may be circulated through an inside of the cooking chamber, to cook the food using the steam.

In the steam oven, the water supply device may be disposed in the electric chamber, which is a space formed above the cooking chamber. Further, a front panel to define a front appearance of the steam oven may be provided in front of the cavity. A front rim area of the cavity may be closed by the front panel, and the front of the electric chamber may also be closed by the front panel.

The water supply device may be provided to be withdrawable forward of the electric chamber. Such a water supply device may include a housing and a water tank.

The housing may be fixed to the electric chamber. The housing may have an accommodating space to accommodate a water tank, and a front surface of the housing is open toward the front.

The water tank may be installed in the housing to be movable forward and rearward in the accommodating space inside of the housing. Such a water tank may be withdrawn forward of the electric chamber through the front panel disposed in front of the electric chamber. To this end, an opening hole to define a passage through which the water tank may pass may be formed in the front panel.

In order for the water tank to be smoothly withdrawn, alignment between the front surface of the water tank and the opening hole may be important. When the opening hole may have a size greater than that of the front surface of the water tank, the water tank may be smoothly withdrawn regardless of accuracy of alignment. However, considering a problem of appearance quality, this is not a preferable method.

Accordingly, the alignment between the front surface of the water tank and the opening hole may be performed with high accuracy in the opening hole and this alignment state may be continually maintained so that the withdrawal of the water tank is smoothly performed while maintaining a minimum distance between the front surface of the water tank and the front panel.

Examples of methods may include a method of fixing the front surface of the housing to the front panel. This method may enable performing the alignment between the front surface of the water tank and the opening hole when the front surface of the housing contacts the front panel and fixing the front surface of the housing to the front panel when this alignment is made.

In this case, fixing between the front panel and the housing may be performed by fastening the front panel and the front surface of the housing with a screw. However, in such a method, the screw used for fastening may be inevitably exposed, resulting in a problem that the appearance quality of products is deteriorated.

In order to avoid this, when the housing is fixed to other components, for example, a bottom surface of the electric chamber, it is not easy to suitably align the front surface of the water tank with the opening hole. Even though the alignment between the front surface of the water tank and the opening hole is suitably performed, it is not easy to continually maintain the alignment. When the housing is not fixed to the front panel, a position of the housing may be changed or the front panel may be deformed, resulting in misalignment between the front surface of the water tank and the opening hole.

Further, as both of the above methods require manual alignment by operators, it is difficult to ensure accuracy of alignment, and there is no high possibility that a predetermined result of alignment is obtained for each product.

BRIEF DESCRIPTION OF THE DRAWINGS

Embodiments will be described in detail with reference to the following drawings in which like reference numerals refer to like elements, and wherein.

DETAILED DESCRIPTION

Hereinafter, embodiments of a cooking appliance according to the present disclosure will be described with reference to the accompanying drawings. For convenience of explanation, thicknesses of lines and sizes of components shown in the figures may be exaggerated for clarity and convenience of explanation. Further, terms described below are defined in consideration of functions of the present disclosure, which may vary depending on an intention or custom of users, and operators. Therefore, definitions of these terms should be made based on the contents throughout the present disclosure.

<General Structure of Cooking Appliance>

Figure 1:
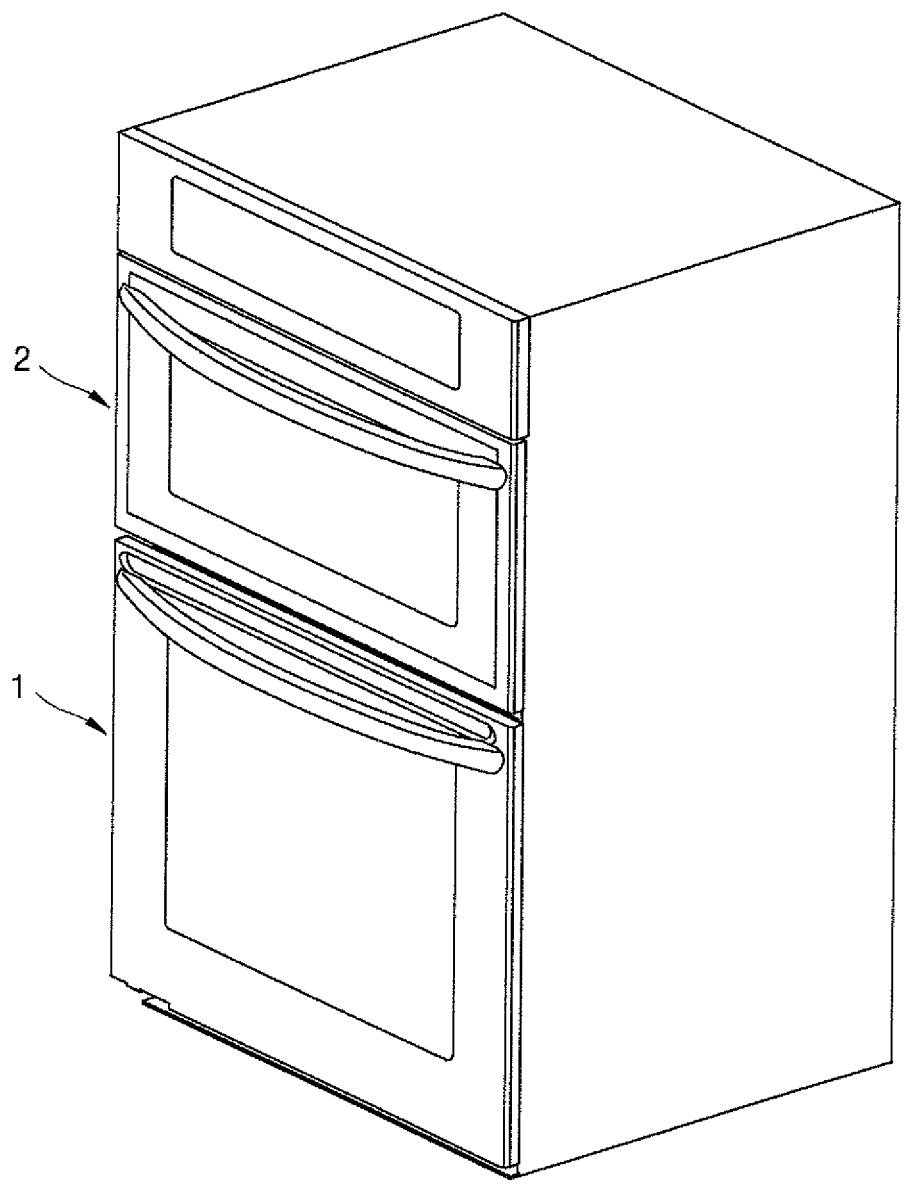
FIG. 1 is a perspective view of a cooking appliance according to an embodiment.
Figure 2:
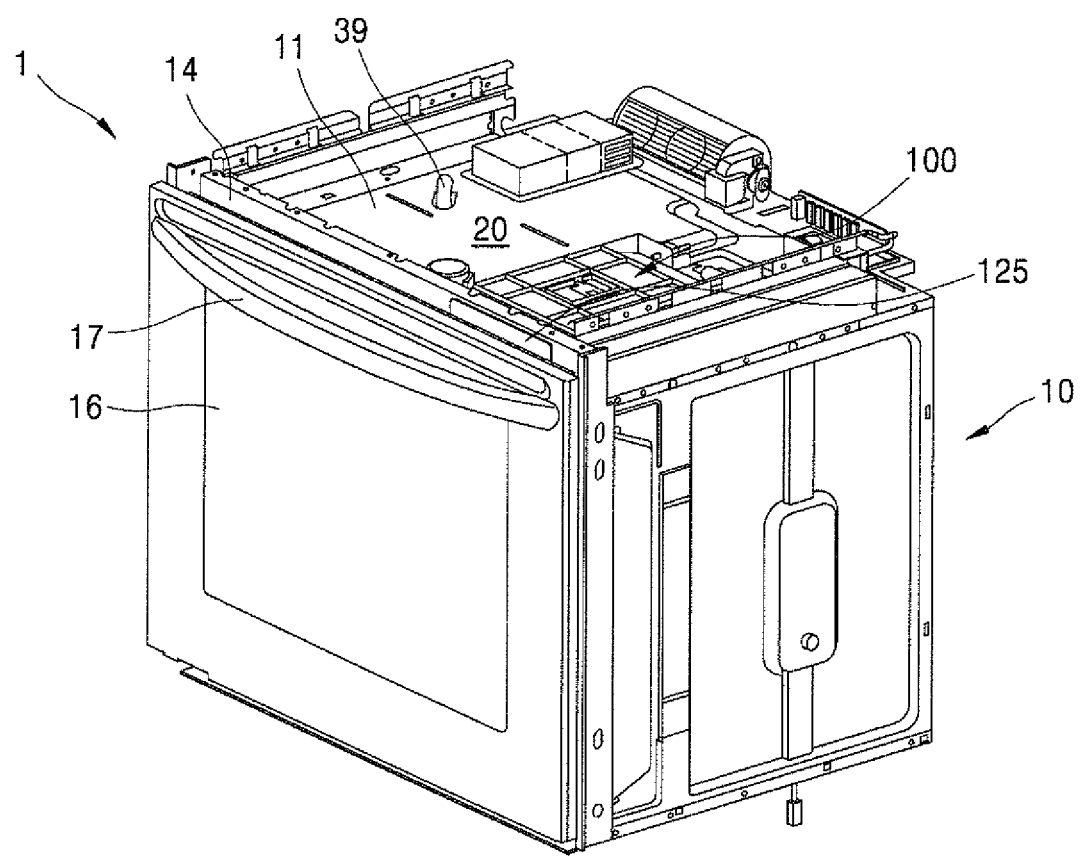
FIG. 2 is a perspective view of a separated portion of the cooking appliance shown in FIG. 1.
Figure 3:
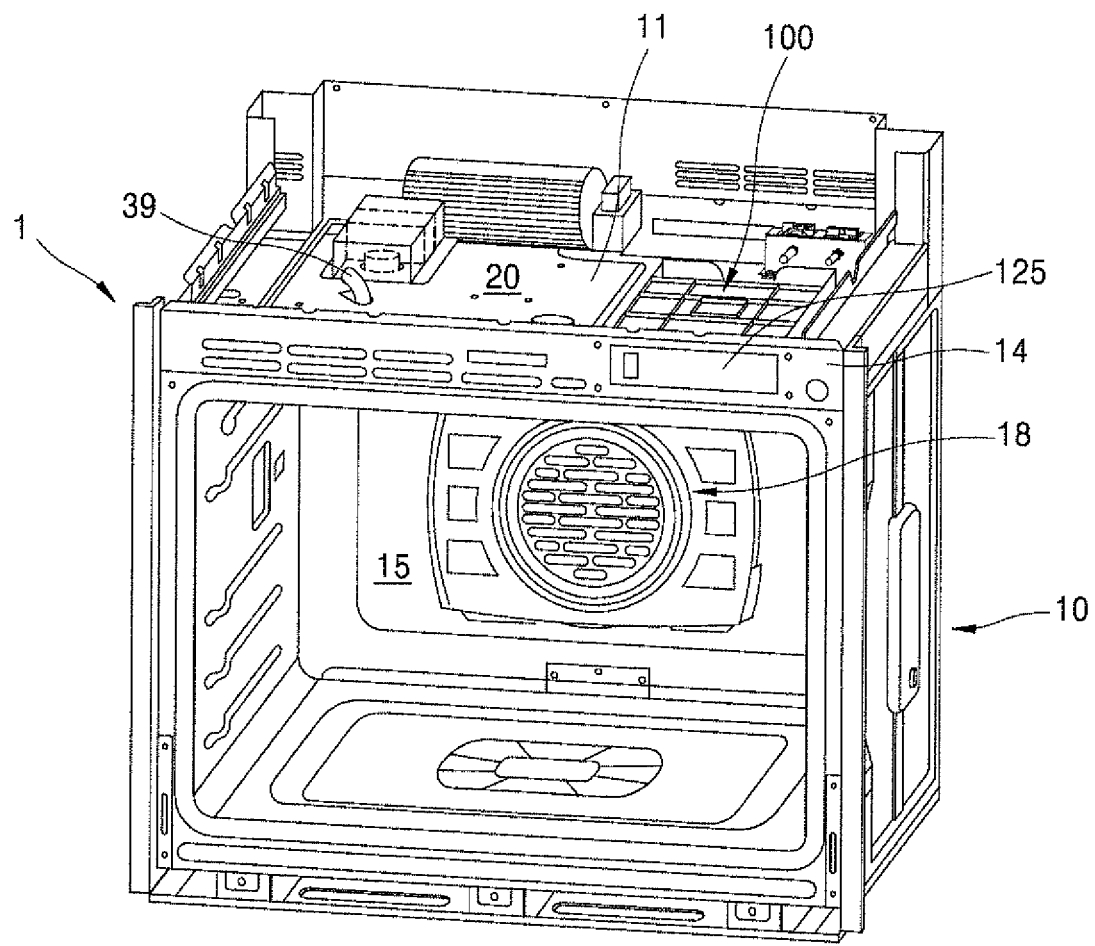
FIG. 3 is a perspective view of a state in which a door is removed from the cooking appliance shown in FIG. 2.

FIG. 1 is a perspective view of a cooking appliance according to an embodiment of the present disclosure. FIG. 2 is a perspective view of a separated portion of the cooking appliance shown in FIG. 1. FIG. 3 is a perspective view of a state in which a door is removed from a cooking appliance shown in FIG. 2.

Referring to FIG. 1, according to an embodiment of the present disclosure, a cooking appliance may include a first unit 1 disposed at a lower portion of the cooking appliance and a second unit 2 disposed at an upper portion of the cooking appliance.

In the present embodiment, both the first unit 1 and the second unit 2 are a closed type cooking appliance such as an electric oven, but the present disclosure is not limited thereto.

For example, the cooking appliance may be configured such that the first unit 1 disposed at the lower portion of the cooking appliance is an electric oven and the second unit 2 disposed at the upper portion of the cooking appliance is a gas oven.

As another example, a closed type cooking appliance other than an oven, such as a microwave oven, may be used for the second unit 2 and an open type cooking appliance, such as a cooktop, hops, grids may be used for the second unit 2 and may be disposed above the first unit 1.

Example of configurations of cooking appliance may include a case in which the first unit 1 and the second unit 2 are electric ovens, and is described below. A configuration of the cooking appliance, for example, a configuration of the first unit I is described. However the closed type cooking appliance according to the invention may include only one unit having a main body 10 as described below.

Referring to FIGS. 1 and 2, an appearance of the first unit 1 is defined by a main body 10. The main body 10 may include a substantially rectangular parallelepiped shape and is made of a material having a predetermined strength to protect a plurality of parts installed in an inner space of the main body 10.

The main body 10 includes a cavity 11 that forms a skeleton of the main body 10 and a front plate 14 disposed forward of the cavity 11 and forms a front surface of the main body 10. A cooking chamber 15 is formed in the cavity 11 and an opening to open the cooking chamber 15 forward is formed in the front plate 14.

A cooking chamber 15 is formed inside of the main body 10. The cooking chamber 15 has a form of a hexahedron whose front surface is open. The cooking appliance heats an inner space of the cooking chamber 15 to cook food when the cooking chamber 15 is closed. That is, in the cooking appliance, food is substantially cooked in the internal space of the cooking chamber 15.

The cooking appliance has a heating device that heats the cooking chamber 15. As an example of such a heating device, a convection heater 18 that heats the internal space of the cooking chamber 15 by convecting hot air may be provided at a rear of the cooking chamber 15. An upper heater that heats the internal space of the cooking chamber 15 from above may be provided at an upper portion of the cooking chamber 11 as a heating device. Further, a lower heater that heats the inner space of the cooking chamber 15 from the lower portion may be provided at the lower portion of the cooking chamber 15 as a heating device.

A door 16 that selectively opens and closes the cooking chamber 15 is rotatably provided at the front side of the main body 10. The door 16 may open and close the cooking chamber 15 in a pull-down manner in which an upper end of the door 16 is vertically rotated about a lower end of the door 16.

The door 16 has a hexahedron shape having a substantially predetermined thickness. A handle 17 is installed at a front surface of the door 16 to be gripped by the user when the user rotates the door 16.

An electric chamber 20 to provide a space in which the electric parts are placed is formed above the main body 10 and a space between the first unit 1 and the second unit 2 that is stacked above the first unit 1. A lower interface of the electric chamber 20 is defined by the upper surface of the cavity 11 and an upper interface of the electric chamber 20 may be defined by the lower surface of the second unit 2. The front surface of the electric chamber 20 may be closed by the front plate 14.

<Structure of Steam Supply Device>

Figure 4:
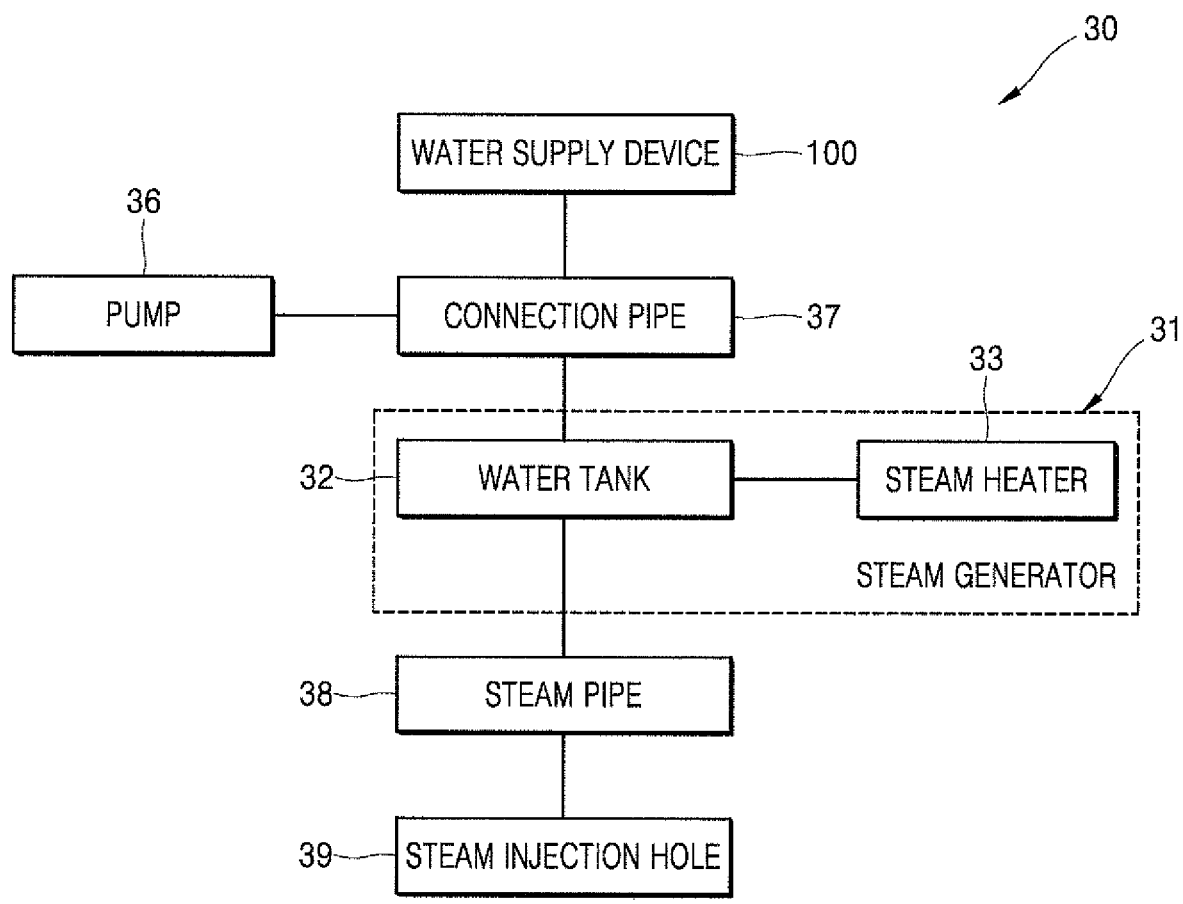
FIG. 4 is a configuration diagram of a configuration of a steam supply device according to an embodiment.

FIG. 4 is a configuration view of a configuration of a steam supply device according to an embodiment of the present disclosure.

Referring to FIGS. 2 to 4, a steam supply device 30 may further be provided inside of a main body 10. The steam supply device 30 is installed in the main body 10 and supplies steam to an inside of the cooking chamber 15 and may include a Steam generator 31, a water supply device 100, and a connection pipe 37.

The Steam generator 31 generates steam by heating water. The Steam generator 31 includes a water tank 32 that accommodates water supplied from the water supply device 100 through the connection pipe 37 and a steam heater 33 that heats the water accommodated in the water tank 32 to generate steam.

The water supply device 100 is provided to store and supply water to be supplied to the Steam generator 31. In this embodiment, the water supply device 100 is installed in the electric chamber 20 formed above the cooking chamber 15, that is, above the main body 10. However, the present disclosure is not limited to thereto. The water supply device 100 may be installed at any selected position in which the water supply device 100 is less influenced by heat in the cooking chamber 15 at high temperatures and the water supply from an outside is easy, and the water supply from the Steam generator 31 is smoothly performed.

The connection pipe 37 connects the water supply device 100 and the Steam generator 31 so that a passage through which the water supplied by the water supply device 100 moves to the Steam generator 31 is formed. The connection pipe 37 may have a flexible tube form or a form of a pipe made of metal.

Further, the connection pipe 37 may be connected to the Steam generator 31 by bypassing the cooking chamber 15 from the water supply device 100 and may be connected to the Steam generator 31 through a path bypassing to the rear side of the cooking chamber 15, and may be connected to the Steam generator 31 through a path bypassing the side of the cooking chamber 15. The connection pipe 37 is omitted from FIGS. 2 and 3.

In the cooking appliance of the present embodiment having the above configuration, the water supplied by the water supply device 100 flows into the water tank 32 through the connection pipe 37 and the water introduced into the water tank 32 is heated by the steam heater 33 to generate the steam, and the generated steam is introduced into the cooking chamber 15 and circulates through an inside of the cooking chamber 15, to cook food using the steam.

At this time, the water supplied by the water supply device 100 may be supplied by a force generated by a height difference or a pressure difference between the water supply device 100 and the water tank 32, or by power of a pump 36 provided adjacent to the water tank 32 or the connection pipe 37.

Further, the steam supply device 30 may further include a steam injection member 39 that injects the steam generated by the Steam generator 31 into the cooking chamber 15. The steam injection member 39 is provided on the upper surface of the cavity 11 or any other suitable location of the cavity, e.g. the upper portion of a side wall of the cavity 11 and is connected to the water tank 32 of the Steam generator 31 through the steam pipe 38. The steam injection member 39 forms a passage for injecting the steam generated by the Steam generator 31 downward into the cooking chamber 15 from the upper portion of the cooking chamber 15. The steam pipe 38 is omitted from FIGS. 2 and 3.

[General Configuration of Water Supply Device and Vicinity Thereof]

Figure 5:
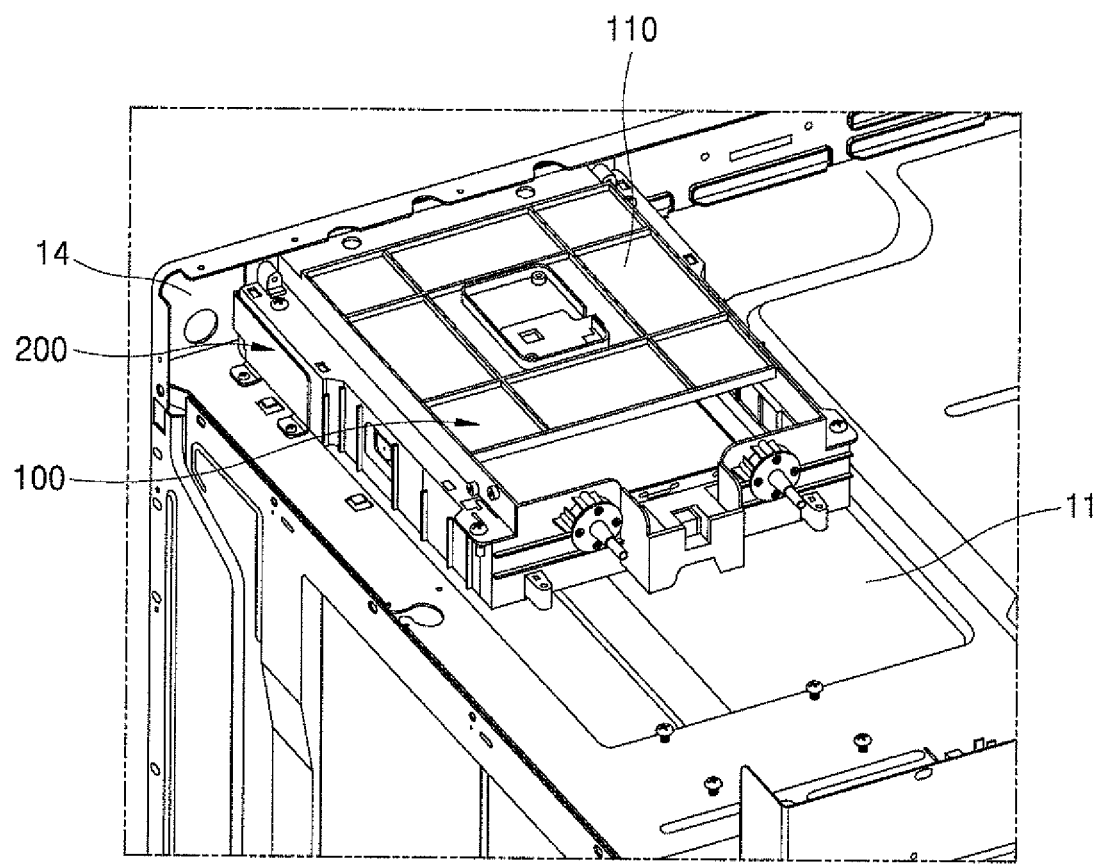
FIG. 5 is a rear perspective view of an upper portion of the cooking appliance shown in FIG. 2.
Figure 6:
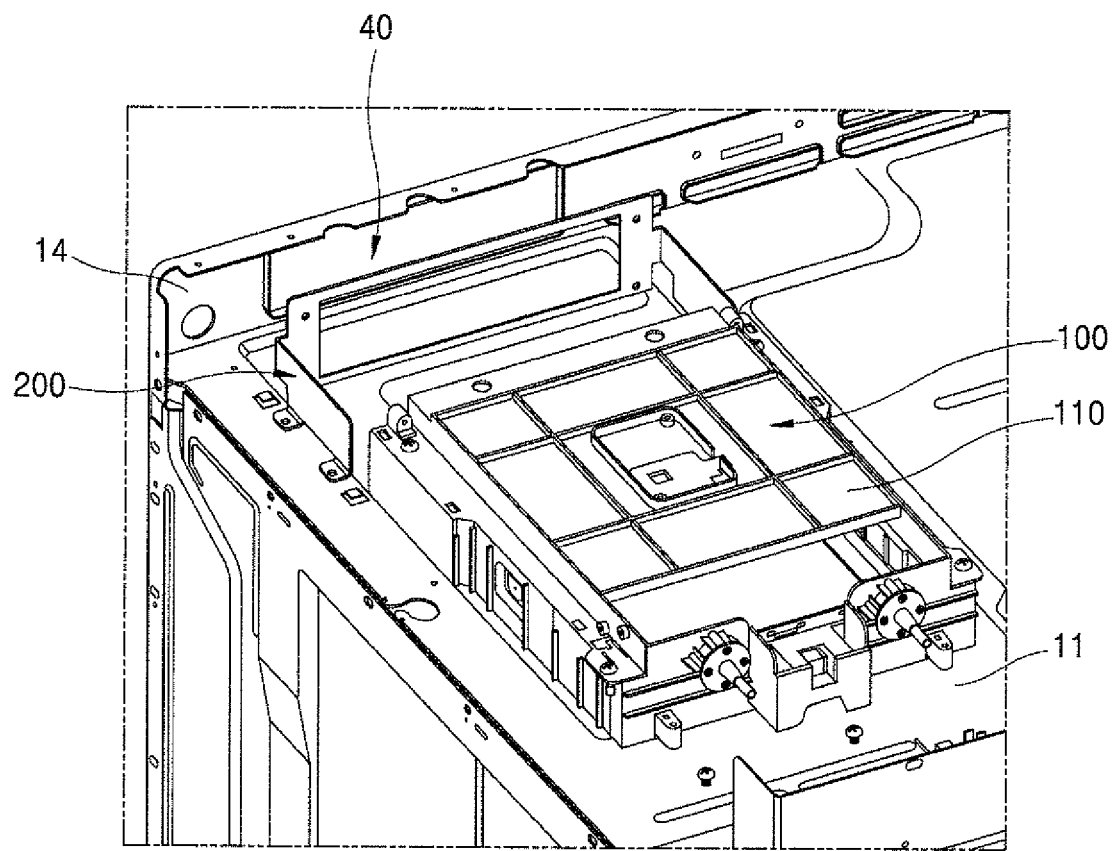
FIG. 6 is a view of a state in which the guide member and the water supply device shown in FIG. 5 are separated from each other.
Figure 7:
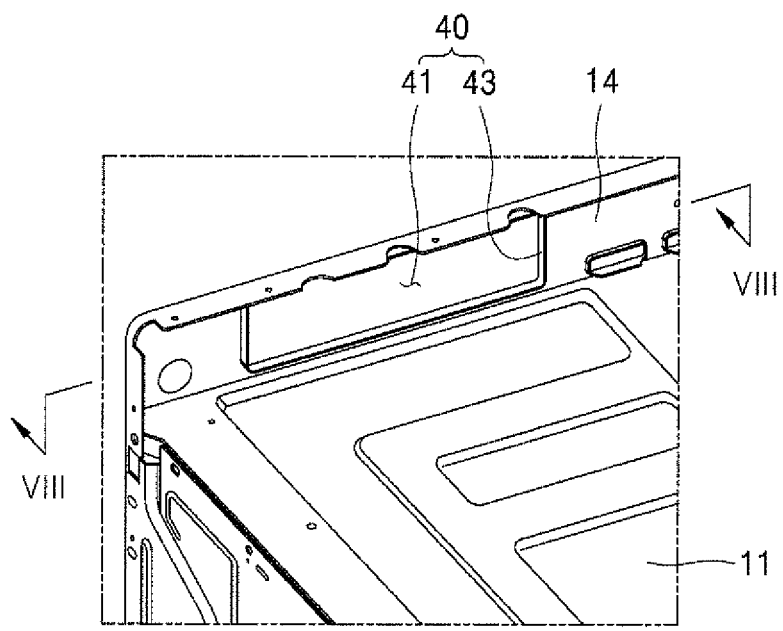
FIG. 7 is a rear perspective view of a state in which the guide member and the water supply device are removed from the cooking appliance shown in FIG. 5.
Figure 8:
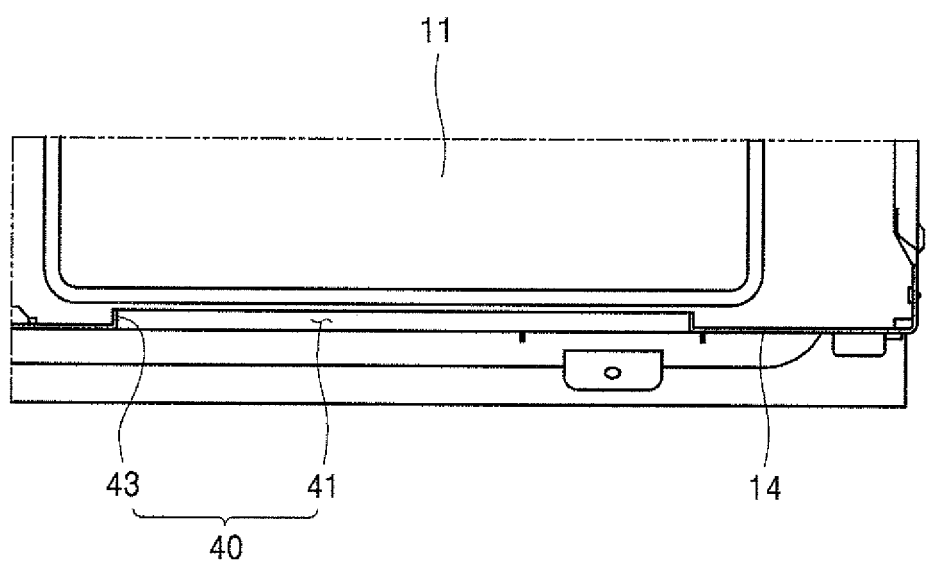
FIG. 8 is a cross-sectional view taken along line "VIII-VIII" of FIG. 7.

FIG. 5 is a rear perspective view of an upper portion of the cooking appliance shown in FIG. 2. FIG. 6 shows a separated state of a guide member and a water supply device shown in FIG. 5. Further, FIG. 7 is a rear perspective view of a state in which a guide member and a water supply device are removed from the cooking appliance shown in FIG. 5. FIG. 8 is a cross-sectional view taken along line "VIII-VIII" of FIG. 7. A water tank is omitted from FIGS. 5 and 6.

Referring to FIGS. 3 and 5, a front panel 14 is provided in front of a cavity 11. A front rim area of the cavity 11 is closed by a front panel 14. A hole is formed in the front panel 14 and a cooking chamber 15 inside of the cavity 11 is opened to the front of the front panel 14 through the hole.

The front panel 14 has a height protruding from an upper portion of the cavity 11. The front portion of an electric chamber 20 is closed by an upper area of the front panel 14 protruding from the upper portion of the cavity 11 as described above.

A water supply device 100 is disposed in the electric space 20. The water supply device 100 includes a housing 110 fixed to the electric chamber 20 and a water tank 120 installed to be movable frontward and/or rearward in an accommodating space inside of the housing 110. The water tank 120 may be withdrawn forward of the cooking appliance through the front panel 14 in the electric chamber 20.

As shown in FIGS. 5 and 6, an opening that provides a passage through which a water tank 120 may pass through the front panel 14 on the front panel 14 is formed in the front panel 14.

Further, a guide member 200 may be provided in the electric chamber 20 where the water supply device 100 is installed. The guide member 200 is provided to adjust and/or align an installation position of the water supply device 100 between the front panel 14 and the water supply device 100. A specific structure and action of the guide member 200 is described below.

[Structure of Front Panel]

Referring to FIGS. 7 and 8, a front panel 14 closes a front of an electric chamber 20 in which a water supply device 100 is installed. An opening 40 is provided in the front panel 14. The opening 40 may include an opening hole 41 and a guide protrusion 43.

The opening hole 41 passes through the front panel 14. The opening hole 41 in the front panel 14 forms a passage to connect the outside of the front panel 14 and the inside of the electric space 20.

In this embodiment, the front surface of the water supply device 100 has a substantially rectangular shape. Accordingly, the opening hole 41 may have a rectangular shape corresponding to the shape of the front surface of the water supply device 100, more specifically, the shape of the front surface 125 is described below.

The guide protrusion 43 protrudes rearward toward the electric chamber 20 at a boundary between the front panel 14 and the opening hole 41. The guide protrusion 43 has a shape corresponding to the shape of the opening hole 41 and surrounds a rear of the opening hole 41 and protrudes rearward of the front panel 14. A burr formed during burring to process the opening hole 41 may protrude rearward of the front panel 14 so that the guide protrusion 43 is formed in the front panel 14.

[Configuration of Water Supply Device]

Figure 9:
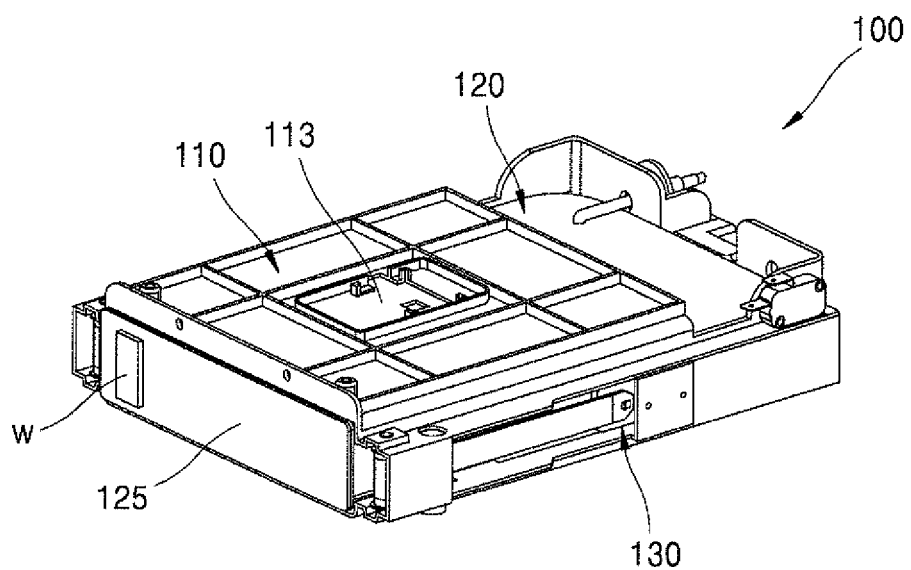
FIG. 9 is a perspective view of the separated water supply device shown in FIG. 5.
Figure 10:
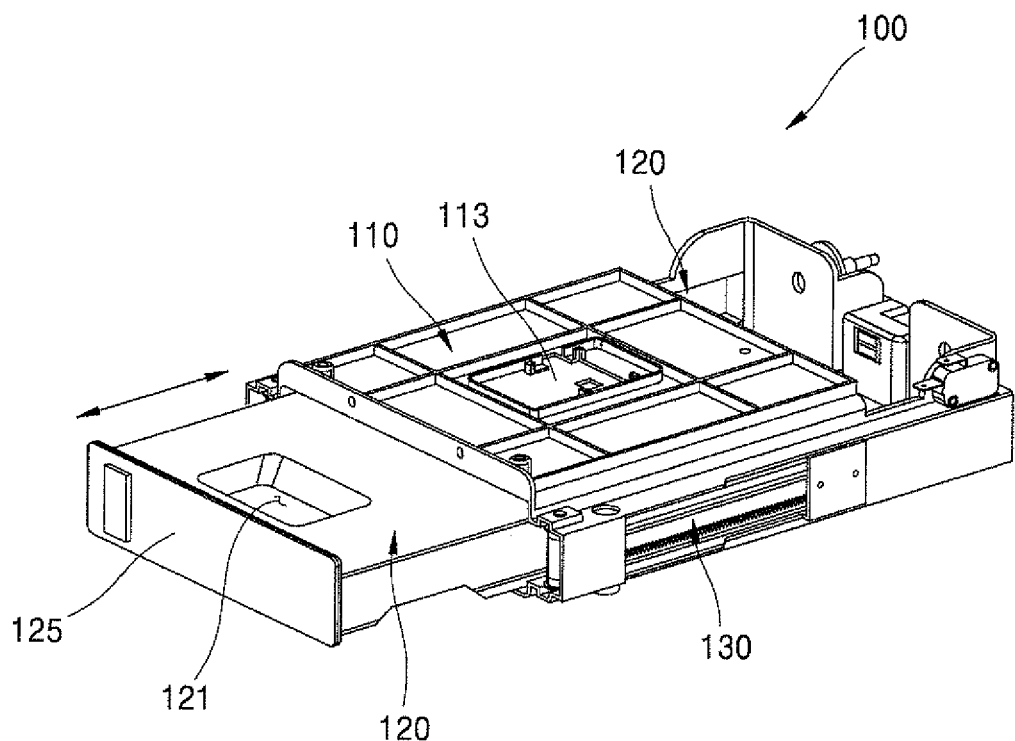
FIG. 10 is a perspective view of a state in which a water tank is withdrawn from the water supply device shown in FIG. 9.

FIG. 9 is a perspective view of a separated water supply device shown in FIG. 5. FIG. 10 is a perspective view of a state in which a water tank is withdrawn out of a water supply device shown in FIG. 9.

Referring to FIGS. 9 and 10, a water supply device 100 may include a housing 11, a water tank 120, and a connector 130.

The housing 110 is installed in a main body 10 of a cooking appliance and has a box shape in which an accommodating space is formed in the housing 110. The housing 110 forms a skeleton to accommodate and install various types of components included in the water supply device 100.

In this embodiment, the housing 110 has a box shape of a hexahedron having an accommodating space in the housing 110. One side of the housing 110 in the front and rear directions, that is, the front side of the housing 110, is formed to be opened so that the accommodating space formed therein may be opened toward the front panel 14. The accommodating space inside of the housing 110 enables accommodating the water tank 120 described below. The open front side of the housing 110 serves as a passage through which the water tank 120 installed in the housing 110 is withdrawn to the outside of the cooking appliance.

A mount 113 that may mount a predetermined component may be provided at an upper surface of the housing 110 that accommodates the water tank 120. Although not shown, for example, as the mount 113 is disposed adjacent to the water tank 120 above the water tank, predetermined components related to the water tank 120 may be installed in the mount 113.

The water tank 120 is provided to store water and supply the stored water to the steam generator 31 (see FIG. 4). A storage space to store water is formed in the water tank 120.

In the present embodiment, the water tank 120 has a box shape of a hexahedron corresponding to the shape of the accommodating space inside of the housing 110. An inlet 121 to define a passage to introduce water into the storage space from the outside of the water tank 120 is provided at an upper portion of the water tank 120. The inlet 121 passes through the upper surface of the water tank 120 and is placed at a front side of the water tank 120.

The water tank 120 is installed inside of the housing 110 and is installed to be movable forward and rearward. The water tank 120 may be installed inside of the water tank 120 so that an entire area of the water tank 120 is placed in the accommodating space in the housing 110. The water tank 120 may also be withdrawn to the outside of the housing 110 and the cooking appliance through the open front side of the housing 110.

The water tank 120 formed as described above is movably installed in the housing 110, and is installed to be able to be withdrawn to the outside of the cooking appliance, if necessary. The water tank 120 may be installed such that the front surface of the water tank 120 is exposed to the outside of the housing 110, as well as exposing to the outside of the cooking appliance through the opening hole 41 (see FIG. 6) of the front panel 14 (see FIG. 6).

As described above, a front portion 125 may be attached to the front surface of the water tank 120, which is a portion exposed to the outside of the main body 10. Preferably, the front portion 125 is made of such material and has such color that may provide a sense of unity with an outer case that defines an appearance of the main body 10, thereby contributing to maintaining aesthetic quality of entire product.

A water level display window w may be provided on the front surface of the water tank 120 and a portion of the front surface 125 attached thereto. The water level display window w is provided so that users may check the level of the water stored in the water tank 120 from the outside of the water tank 120 and the cooking appliance. The water level display window w may be formed in such a manner that a through-hole is formed in front surface of the water tank 120 and a portion of the front surface 125 and a cover made of a transparent material is attached thereto.

A connector 130 movably couples the water tank 120 to the housing 110. The connector 130 is installed in the housing 110 to be movable forward and rearward within the accommodating space and moves forward and rearward to change the position of the water tank 120 to an insertion position or a withdrawal position.

The connector 130 includes a structure that movably couples the water tank 120 to the housing 110 and a structure that connects parts that provide power to move the water tank 120 and parts that fix the position of the water tank 120 to the housing 110.

That is, the water tank 120 is movably coupled to the housing 110 via the connector 130. At this time, the water tank 120 is coupled to the housing 110 so that the relative positions of the front portion 125 with respect to the housing 110 in the vertical direction and the lateral direction thereof are maintained constant.

[Structure of Guide Member]

Figure 11:
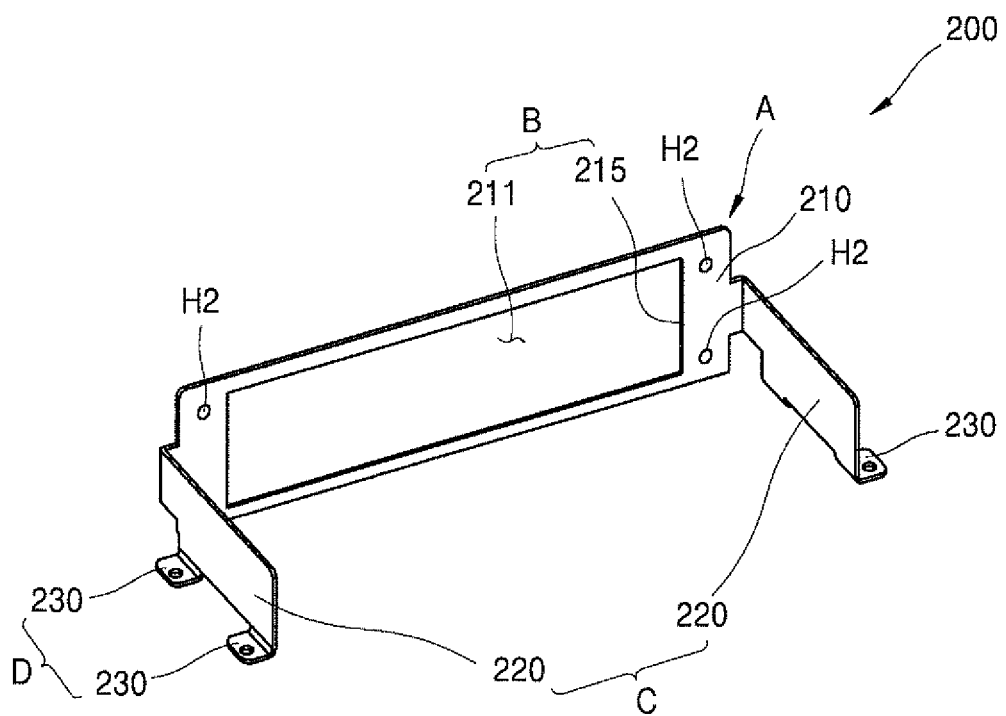
FIG. 11 is a perspective view of a separated guide member shown in FIG. 5.
Figure 12:
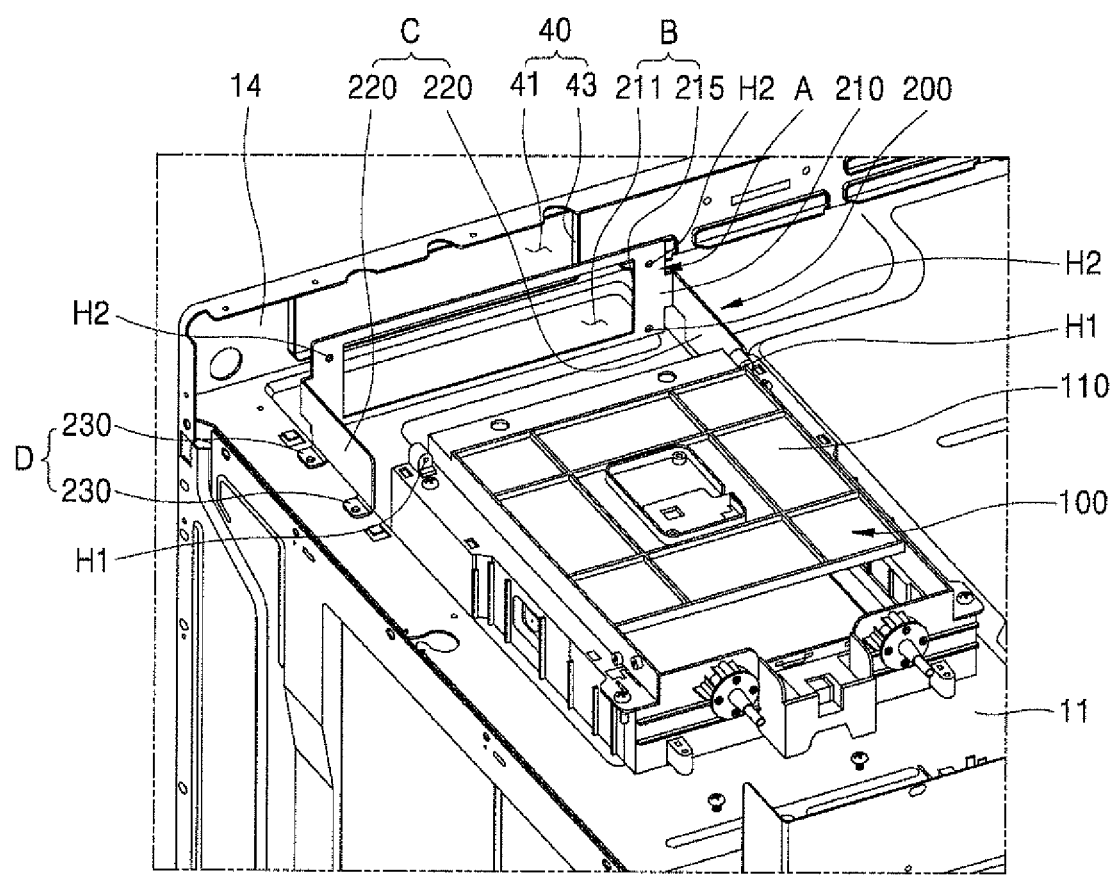
FIG. 12 is a rear perspective view of a state before a front panel, a guide member, and a water supply device are coupled to one another.

FIG. 11 is a perspective view of a separated guide member shown in FIG. 5, and FIG. 12 is a rear perspective view of a state before a front panel, a guide member, and a water supply device are coupled to one another. A water tank is omitted from FIG. 12.

Referring to FIGS. 11 and 12, a guide member 200 includes a first guide A, a second guide B, and a fixer.

The first guide A is coupled to a water supply device 100 to align a relative position of a front portion 125 with respect to the guide member 200. The first guide A may include a front plate 210 that is formed in a plane parallel to a front panel 14. The front plate 210 forms a plane parallel to the front surface of a housing 110 provided in the water supply device 100. The front plate 210 is disposed between a front panel 14 and the housing 110. The front surface of the front plate 210 may have a flat surface that may contact the front panel 14 and the rear surface thereof may have a flat surface that contacts the housing 110.

Relative positions of the housing 110 with respect to the guide member 200 may be aligned forward and rearward when the front surface of the housing 110 contacts the front plate 210. Further, a water tank 120 (see FIG. 9) may be coupled to the housing 110 so that a relative position of a front portion 125 with respect to the housing 110 is maintained constant vertically and laterally. The relative position of the front surface 125 with respect to the guide member 200 may be aligned when the front surface of the housing 110 contacts the front plate 210.

The front surface of the housing 110 is coupled to the front plate 210 when the front surface of the housing 110 contacts a rear surface of the front plate 210. Accordingly, the water supply device 100 is coupled to the first guide A. Further, as described above, when the water supply device 100 is coupled to the first guide A, the relative position of the front surface 125 with respect to the guide member 200 may be aligned.

At this time, the water supply device 100 may be coupled to the guide member 200 so that the relative position of the front surface 125 with regard to the guide member 200 is fixed to a first position. The first position may be configured such that an open front shape of the housing 110 is overlaid with the opening hole 41 described below to correspond to each other.

According to the present embodiment, a plurality of fastening holes H1 and H2 may be provided on the front surface of the housing 110 and the front plate 210, respectively. At this time, the fastening holes H1 provided on the front surface of the housing 110 and the fastening holes H2 provided on the front plate 210 are disposed at a position in which the fastening hole H1 is overlapped with the fastening hole H2 when the front surface of the housing 110 contacts the front plate 210.

When the front surface of the housing 110 and the front plate 210 contact each other, a fastening member such as a screw passes through the fastening holes H1 and H2 to couple the housing 110 to the front plate 210.

The fastening holes H1 and H2 provided on the front surface of the housing 110 and the front plate 210 may be disposed at a position in which a relative position of the front portion 125 with respect to the guide member 200 is fixed to the first position when the front surface of the housing 110 and the front plate 210 are coupled to each other.

The second guide B is fastened to the guide protrusion 43 to align the relative position of the guide member 200 with respect to an opening 40. The second guide B may include a through-hole 211 that passes through the front plate 210 and an inner surface 215 of the front plate 210 that surrounds the through-hole 211.

The guide protrusion 43 may be fitted to the second guide B through the through-hole 211, so that the coupling between the second guide B and the guide protrusion 43 may be performed. An outer surface of the guide protrusion 43 closely contact an inner surface 215 of the front plate 210 through the through-hole 211, so that the fitting between the guide protrusion 43 and the second guide B may be performed.

When the second guide B and the guide protrusion 43 are coupled to each other, the relative position of the guide member 200 with respect to the opening 40 may be aligned. At this time, relative position of the guide member 200 with respect to the opening 40 may be aligned so that the guide member 200 is fixed to the second position. The second position may be configured such that the opening hole 41 formed in the front panel 14 is overlaid with the through-hole 211 formed in the front plate 210 to correspond to each other.

The fixer fixes the guide member 200 to a cavity 11. The fixer includes a pair of side plates 220 and a bottom plate 230.

The pair of side plates 220 is disposed at both lateral sides of the front plate 210. Each side plate 220 is formed in a plane parallel to the side of the water supply device 100, and more particularly, the housing 110.

The pair of side plates 220 extends rearward from both ends of the front plate 110. A distance between the pair of side plates 220 preferably corresponds to a length corresponding to a lateral length of the housing 110.

The bottom plate 230 provides a coupling surface between each of side plates 220 and the cavity 11. The bottom plates 230 are provided below the side plates 220, respectively. Each of the bottom plates 230 may be formed in a plane parallel to the upper surface of the cavity 11. At this time, each bottom plate 230 is disposed laterally outward of a third guide C including a pair of side plates 220 described below.

The guide member 200 may have a form in which the front plate 210, the side plate 220, and the bottom plate 230 are integrally formed. According to the above, the front plate 210 and the pair of side plates 220 may be formed by laterally bending an elongated metal plate to have a U-shape. The bottom plate 230 may be shaped by vertically bending each of the side plates 220 to have a L-shape.

That is, the guide member 200 may be easily, quickly, and inexpensively formed only by bending the metal plate without adding an additional structure and an performing additional fastening operation of coupling the additional structure thereto.

The fixer including the side plate 220 and the bottom plate 230 may include a third guide C and a coupler D.

The third guide C guides the lateral coupling position between the first guide A and the water supply device 100. The third guide C includes a pair of side plates 220 spaced apart from each other at intervals corresponding to the lateral length of the water supply device 100, and more specifically, the housing 110.

The housing 110 may be inserted into an inside of the third guide C, that is, a space between a pair of side plates 220. When the housing 110 is inserted into the space between the pair of side plates 220, the lateral coupling position of the housing 110 and the first guide A may be guided.

The fixer D is coupled to the cavity 11 to fix the guide member 200 to the cavity 11. The coupler D may include a plurality of bottom plates 130 coupled to the upper surface of the cavity 11.

[Connection Structure Among Front Panel, Guide Member, and Water Supply Device]

Figure 13:
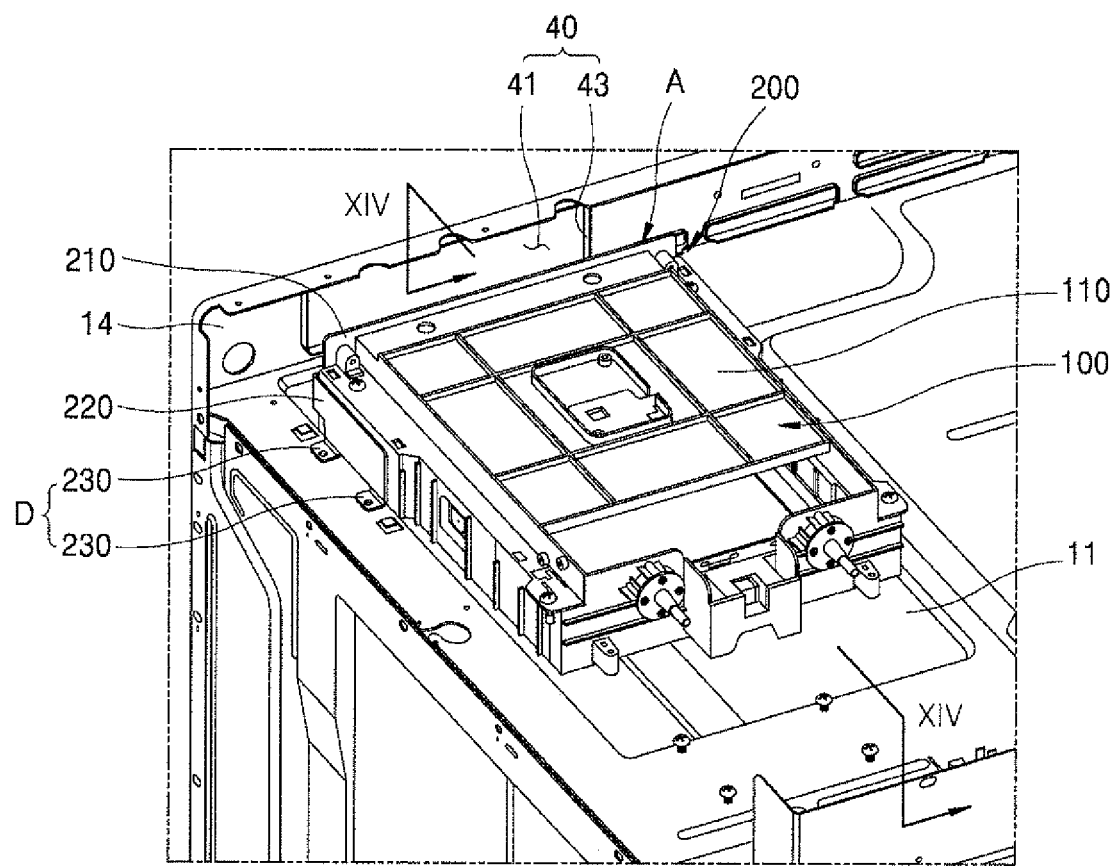
FIG. 13 is a rear perspective view of a state in which a guide member is coupled to a water supply device.
Figure 14:
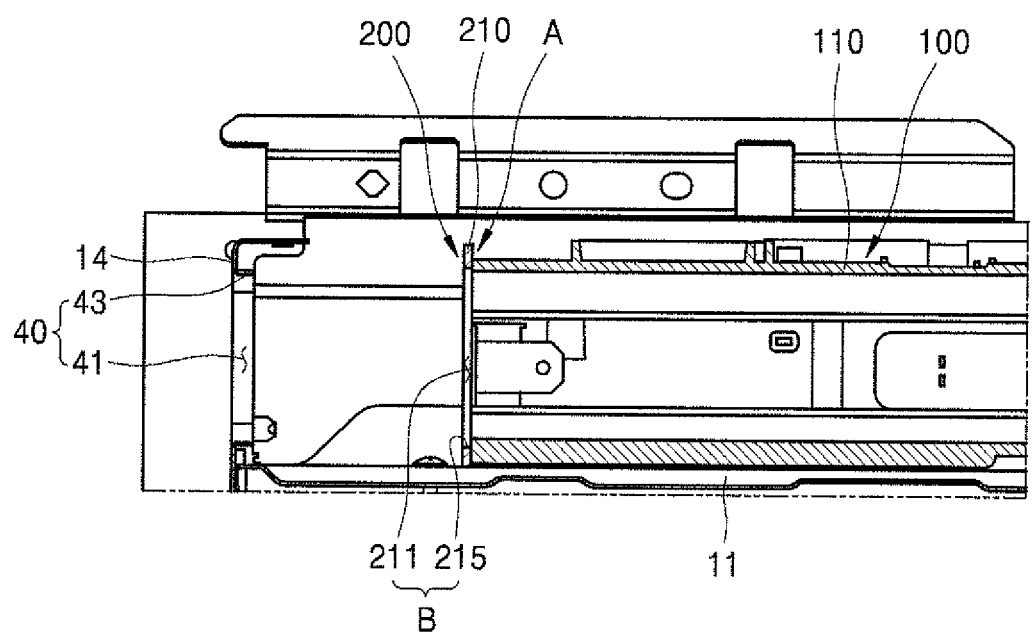
FIG. 14 is a cross-sectional view taken along line "XIV-XIV" in FIG. 13.
Figure 15:
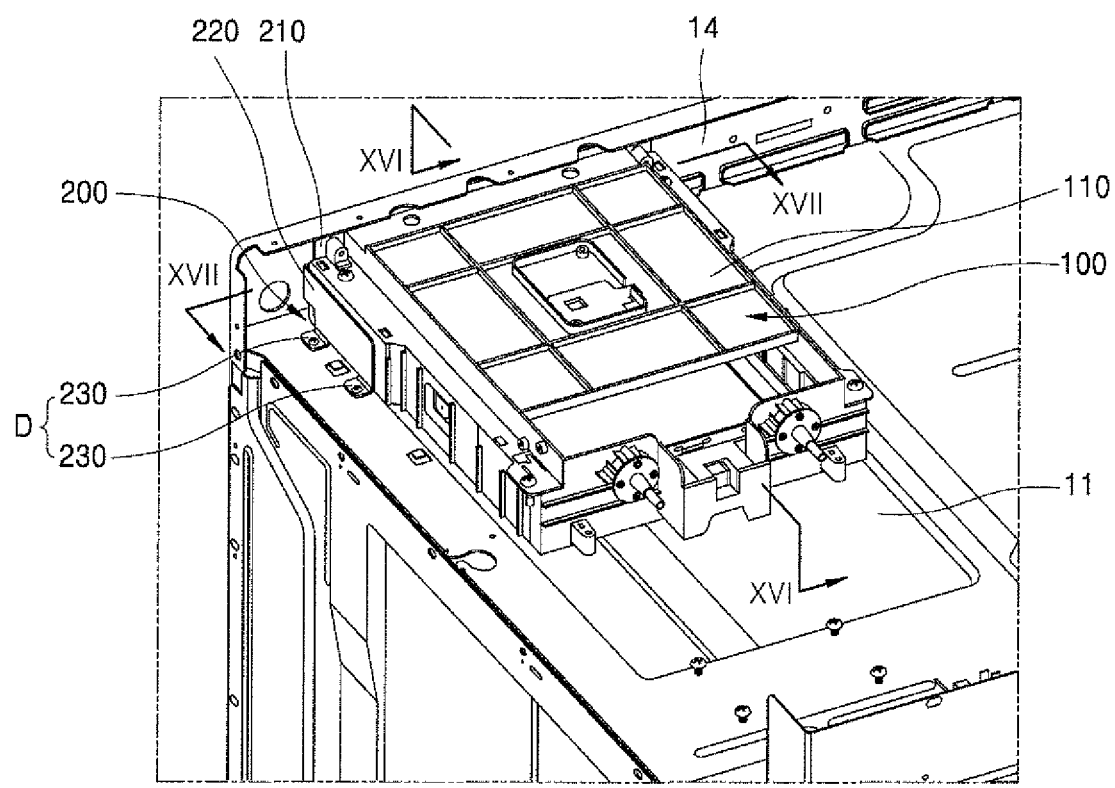
FIG. 15 is a rear perspective view of a state in which a front panel, a guide member, and a water supply device are coupled to one another.
Figure 16:
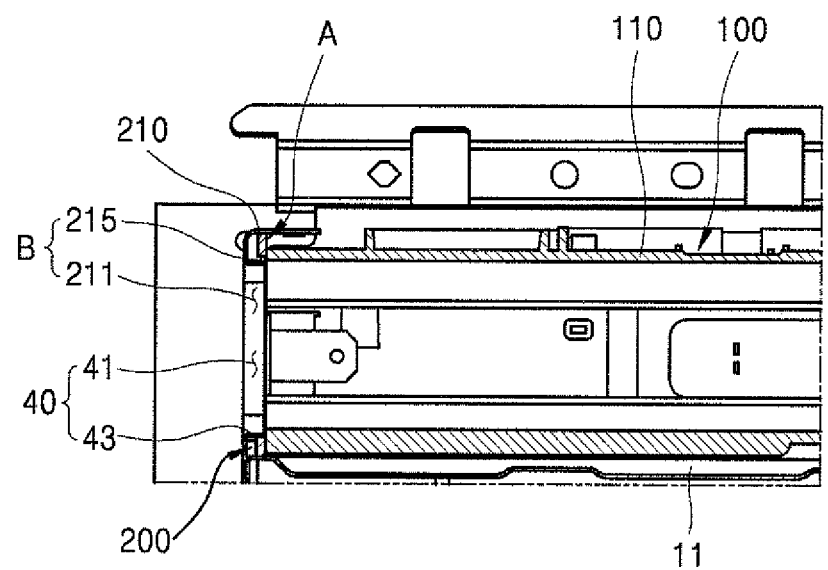
FIG. 16 is a cross-sectional view taken along line "XVI-XVI" in FIG. 15.
Figure 17:
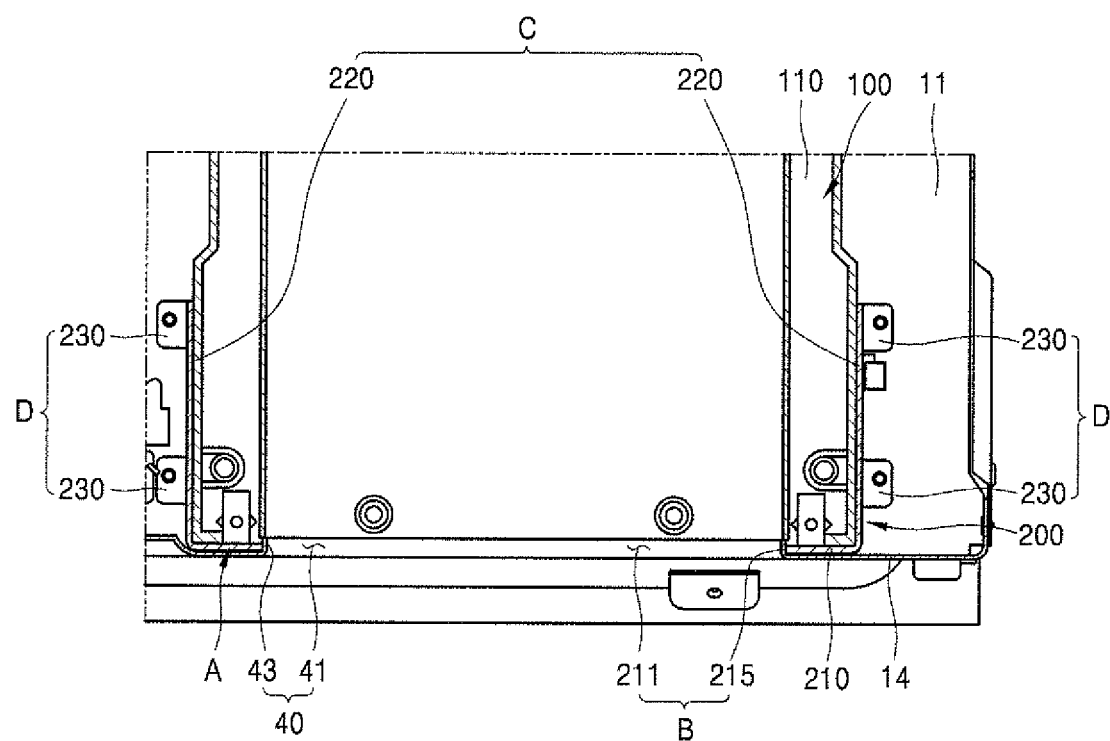
FIG. 17 is a cross-sectional view taken along line "XVII-XVII" in FIG. 15.
Figure 18:
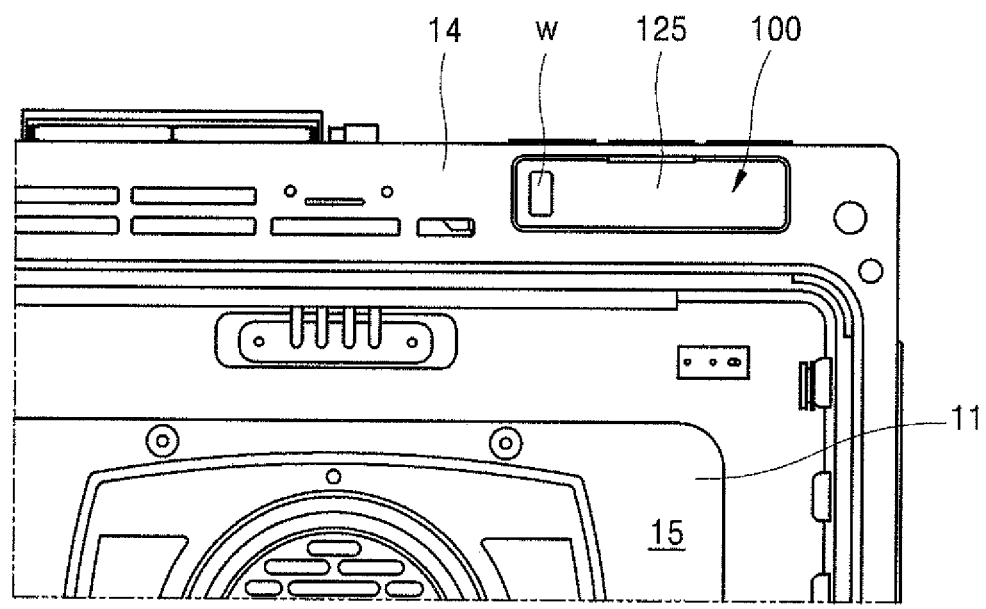
FIG. 18 is a front view of a front surface of a cooking appliance in a state in which a front panel, a guide member, and a water supply device are coupled to one another.
Figure 19:
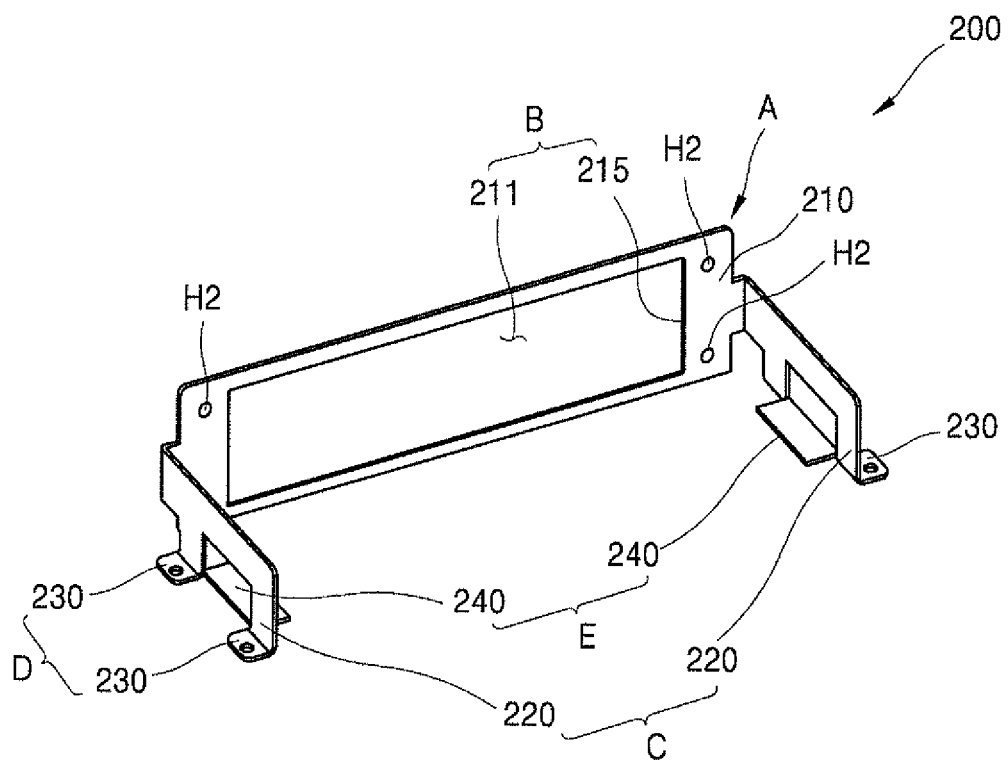
FIG. 19 is a perspective view of another example of a guide member according to an embodiment.

FIG. 13 is a rear perspective view of a state in which a guide member and a water supply device are coupled to each other. FIG. 14 is a cross-sectional view taken along line "XIV-XIV" in FIG. 13. FIG. 15 is a rear perspective view of a state in which a front panel, a guide member, and a water supply device are coupled. Further, FIG. 16 is a cross-sectional view taken long "XVI-XVI" in FIG. 15. FIG. 17 is a cross-sectional view taken along line "XVII-XVII". FIG. 18 is a front view of a front surface of a cooking appliance in a state in which coupling among a front panel, a guide member, and a water supply device are completed. Further, FIG. 19 is a perspective view of another example of a guide member according to an embodiment of the present disclosure. A water tank is omitted from FIGS. 13 to 18.

Hereinafter, a coupling structure among the front panel, the guide member, and the water supply device will be described in detail with reference to FIGS. 12 to 19.

Referring to FIGS. 12 and 13, the coupling between the guide member 200 and a housing 110 firstly proceeds to perform the coupling among a front panel 14, a guide member 200, and a water supply device 100.

To this end, the housing 110 is first inserted into an inside of a third guide C, that is, a space between a pair of side plates 22. At this time, the housing 110 may be inserted into the front from the rear side of the guide member 200, or may be inserted into the rear side of the guide member 200 from the upper side thereof.

When the housing 110 is inserted into the third guide C, the housing 110 closely contacts a front plate 210 so that the front surface of the housing 110 contacts the rear surface of the front plate 210. At this time, the lateral coupling position between the housing 110 and the first guide A, that is, between the housing 110 and the front plate 210 may be guided by the third guide C.

As shown in FIGS. 13 and 14, the housing 110 is placed at a position in which fastening holes H1 provided at the front surface of the housing 110 are overlapped with fastening holes H2 provided at the front plate 210. At this time, as the position of the lateral coupling between the housing 110 and the front plate 210 is already guided by the third guide C, the fastening holes H1 and H2 may be easily aligned by adjusting only vertical position between the housing 110 and the front plate 210.

When the fastening holes H1 and H2 are aligned, the coupling between the housing 110 and the front plate 210 is made using a fastening member. When the coupling between the housing 110 and the front plate 210 is performed, relative position of a front surface 125 (see FIG. 18) with respect to the guide member 200 is aligned. At this time, the relative position of the front surface 125 with respect to the guide member 200 is fixed to the first position.

The first position may be configured such that the open front shape of the housing 110 is overlaid with an opening hole 41 described below to correspond to each other. The first position is defined as a position in which the position of the front surface 125 is guided to a setting position in an opening 40 when the guide member 220 is fixed to the second position.

The relative position of the front portion 125 with respect to the guide member 200 may be fixed to the first position by coupling the guide member 200 and the housing 110 as described above. Therefore, in the above state, when the guide member 200 is fixed only to the second position through a subsequent process, the position of the front portion 125 may be smoothly guided to the setting position inside of the opening 40. The subsequent operation to fix the guide member 200 to the second position is described below in detail.

Referring to FIGS. 15 to 17, the coupling between a second guide B and the guide protrusion 43 proceeds when the coupling between the housing 110 and the guide member 200 is completed as described above.

The coupled body of the housing 110 and the guide member 200 is moved to a direction in which a rear surface of the front panel 14 contacts a front surface of the front plate 210. At this time, the front surface of the front plate 210 is preferably disposed on the rear surface of the front panel 14 at a position in which the position of the second guide B corresponds to the position of the guide protrusion 43 in a straight line.

Then, the second guide B and the guide protrusion 43 are coupled to each other. The guide protrusion may be fitted to the second guide B through a through-hole 211, so that the second guide B and the guide protrusion 43 is coupled. The fitting between the guide protrusion 43 and the second guide B may be performed by contacting the outer surface of the guide protrusion 43 with an inner surface 215 of the front plate 210 and passing through the through-hole 211.

As described above, when the guide protrusion 43 and the front plate 210 are coupled to each other in a state in which the outer surface of the guide protrusion 43 closely contacts the inner surface of the front plate 210, the relative position of the guide member 200 with respect to the opening 40 may be aligned. At this time, the relative position of the guide member 200 with respect to the opening 40 is aligned so that the guide member 200 is fixed to the second position, and the alignment state may be maintained.

As the relative position of the front surface 125 with respect to the guide member 200 is already fixed to the first position by the previous operation, when the guide member 200 is fixed to the second position as described above, as shown in FIGS. 17 and 18, the position of the front surface 125 may be smoothly guided to the setting position inside of the opening 40.

That is, when the guide member 200 is coupled to the designated position of the front panel 14 after the housing 110 is coupled to the designated position of the guide member 200, the position of the front surface 125 may be smoothly guided to the setting position inside of the opening 40.

The setting position is defined as a position in which an outer circumferential surface of the front surface 125 has a predetermined distance to an inner circumferential surface of the front panel 14 that surrounds the front surface 125 when the front surface 125 is inserted into the opening hole 41.

At this time, the distance between the outer circumferential surface of the front surface 125 and the inner circumferential surface of a front panel 14 is preferably set such that components disposed rearward of the front panel 14 is prevented from being exposed through a gap between the front surface 125 and a front panel 14 as much as possible.

The distance between the outer circumferential surface of the front surface 125 and the inner circumferential surface of the front panel 14 is preferably set as a distance in which the water tank 120 is smoothly withdrawn or inserted, without generating interference between the front surface 125 and the front panel 14 when the water tank 120 is withdrawn or inserted, for example, a distance may be about 1.8 mm.

In a state in which the bottom plate 230 is coupled to the upper surface of the cavity 11 by a fastening member such as a screw, when the position of the front portion 125 is guided to the setting position inside of the opening 40, the installation of the water supply device 100 is completed when the position of the front portion 125 is fixed to the setting position inside of the opening 40.

The coupling between the guide member 200 and the cavity 11 is performed by the coupling between the bottom plate 230 and the upper surface of the cavity 11, and the housing 110 is coupled to the guide member 220 by the coupling between the front surface of the housing 110 and the front plate 210. That is, the housing 110 is coupled to the upper surface of the cavity 11 through the coupling between the cavity 11 and the guide member 200. The housing 110 maintains the fitting with the front panel 14 through the fitting between first guide A and the guide protrusion 43.

At this time, only the fitting between the first guide A and the guide protrusion 43 is performed between the front panel 14 and the guide member 200. That is, the front panel 14 and the guide member 200 are not coupled to each other by a fastening member such as a screw.

According to the present embodiment, the housing 110 is fixed to the upper surface of the cavity 11 and is fixed to the cavity 11, and the fitting between the housing 110 and the front panel 14 is performed with the guide member 200 therebetween. Therefore, even when the front panel 14 and the guide member 200 are not coupled to each other by the fastening member, the alignment state between the front surface 125 and the opening hole 41 may be sufficiently and continually maintained.

Meanwhile, FIG. 19 shows another example of a guide member 200.

Referring to FIGS. 15 and 19, the guide member 200 may further include a supporting plate 240. The supporting plate 240 is formed in a plane parallel to the bottom surface of the water supply device 100 and is disposed on the inner lateral side of the third guide C. The supporting plates 240 may be formed by bending a portion of each bottom plate 230 inwardly in the lateral direction of the third guide C, respectively. That is, a plurality of supporting plates 240 that are formed below the bottom plate 230 disposed at both sides of the third guide C are disposed in the lateral inner side of the third guide C.

Further, the fixer may further include a fourth guide E. The fourth guide E guides a vertical coupling position of the first guide A and the water supply device 100. The fourth guide E may include a supporting plate 240.

The supporting plate 240 of the fourth guide E is formed in a plane parallel to the bottom surface of the housing 110 to support the housing 110 from below. At this time, the supporting plate 240 is provided at a position in which the housing 110 may be supported when a height of the fastening hole H1 formed on the front surface of the housing 110 is the same as the height of the fastening hole H2 formed in the front plate 210.

Therefore, when the housing 110 is inserted into the guide member 200, the lateral coupling position of the first guide A and the water supply device 100 is guided by the third guide, and the vertical coupling position of the first guide A and the water supply device 100 is guided by the fourth guide E.

As a result, the relative position of the front surface 125 with respect to the guide member 200 may be aligned more easily and accurately.

According to the present embodiment, in the cooking appliance as described above, it is possible to provide an effect in which the front surface 125 and the opening hole 41 may be aligned easily and with high accuracy only by a simple operation of coupling the housing 110 at the designated position of the guide member 200 and coupling the guide member 200 at the designated position of the front panel 14.

Further, according to this embodiment, the front surface 125 may be aligned with high accuracy so that the water tank 120 may be smoothly withdrawn and inserted to provide an improved function, as well as smoothly maintaining the front panel 14 exposed to an outside thereof without a fastening portion to provide an improved appearance quality.

The present disclosure provides a cooking appliance with an improved structure so that alignment between a front surface of a water tank and an opening hole is performed easily and with high accuracy.

The object is solved by the features of the independent claims. Preferred embodiments are given in the dependent claims.

According to an embodiment of the present disclosure to achieve the object, a cooking appliance includes a guide member that regulates an installation position of a water supply device between a front panel and the water supply device, and the guide member includes a first guide that is coupled to the water supply device to align a relative position of the water supply device with respect to the guide member and a second guide that aligns a relative position of the guide member with respect to the front panel.

Preferably, the first guide may be coupled to the water supply device to align the relative position of the front portion of the water supply device with respect to the guide member.

Preferably, the second guide may be coupled to a guide protrusion formed on the front panel to align a relative position of the guide member with respect to the opening including the guide protrusion.

Preferably, the guide member may further include a fixer that fixes the guide member to the cavity.

Preferably, a connector may movably couples the water tank to the housing.

According to this configuration, alignment between the front portion and the opening hole may be performed easily and with high accuracy by a simple operation of coupling the housing at a designated position of the guide member and coupling the guide member at a designated position of the front panel.

According to the present disclosure, the cooking appliance includes: a cavity; an electric chamber formed above the cavity; a front panel that is installed in front of the cavity and closes the front of the electric chamber; an opening including an opening hole that defines a passage to open between the front of the front panel and the electric chamber forward and rearward, in the front panel, and a guide protrusion that protrudes rearward toward the electric chamber at a boundary between the front panel and the opening hole; a water supply device that is disposed in the electric chamber and includes a front portion exposed forward of the front panel through the open hole; and a guide member that regulates an installation position of the water supply device between the front panel and the water supply device, and the guide member includes a first guide that is coupled to the water supply device to align the relative position of the front portion with respect to the guide member; a second guide that is coupled to the guide protrusion to align the relative position of the guide member with respect to the opening; and a fixer that fixes the guide member to the cavity.

Preferably, the first guide may include a front plate formed in a plane parallel to the front panel, the second guide may include a through-hole that passes through the front plate and an inner surface of the front plate that surrounds the through-hole.

Preferably, the front plate may be coupled to the front of the water supply device to align the relative position of the front portion with respect to the guide member.

Preferably, the guide protrusion may pass through the through-hole and is fitted to the second guide so that the relative position of the guide member with respect to the opening is aligned.

According to the above, the alignment between the front portion of the water tank and the opening hole may be performed easily and with high accuracy by the simple operation of inserting the second guide into the guide protrusion protruding from the front panel.

Further, it is preferable that the fixer includes a pair of side plates disposed at both lateral sides of the front plate and formed in a plane parallel to a side surface of the water supply device.

Preferably, the fixer may include a bottom plate that provides a coupling surface between each of the side plates and the cavity.

Preferably, the fixer may include a third guide that guides a lateral coupling position between the first guide and the water supply device and a coupler that is coupled to the cavity.

Preferably, the third guide may include the pair of side plates that are spaced apart by a distance corresponding to a lateral length of the water supply device.

Preferably, the coupler may include the bottom plate that is coupled to the upper surface of the cavity.

Preferably, a water level display window may be provided on the front surface of the water tank and/or a portion of the front surface attached thereto.

With this configuration, as the lateral coupling position between the housing and the guide member is easily and accurately guided, the alignment operation between the front portion of the water tank and the opening hole may be performed easier.

According to the present disclosure, the cooking appliance may have an effect that alignment between the front portion of the water tank and the opening hole is performed easily and with high accuracy, by a simple operation of, after coupling the housing at the designated position of the guide member, coupling the guide member at the designated position of the front panel.

Further, according to the present disclosure, the cooking appliance may enable the front surface of the water tank to be aligned with high accuracy and withdrawal and insertion of the water tank is smooth performed to provide an improved function, as well as smoothly maintaining the front panel exposed to an outside without a fastening portion to provide an improved appearance quality.

While the present disclosure has been described with reference to exemplary embodiments shown in the figures, it is merely illustrative, and it will be understood by the skilled person in the art that various modifications and equivalent other embodiments can be made. Thus, a true technical scope of the present disclosure should be defined by the following claims.

DESCRIPTION OF SYMBOLS

10: Main body
11: Cavity
14: Front panel
15: Cooking chamber
16: Door
17: Handle
18: Convection heater
20: Electric chamber
30: Steam supply device
31: Steam generator
32: Water tank
33: Steam heater
36: Connection pipe
40: Opening
41: Opening hole
43: Guide protrusion
100: Water supply device
110: Housing
113: Mount
120: Water tank
121: Inlet
125: Front surface
130: Connector
200: Guide member
210: Front plate
211: Through-hole
215: Inner side
220: Side plate
230: Bottom plate
240: Supporting plate
A: First guide
B: Second guide
C: Third guide
D: Coupler
E: Fourth guide
H1 and H2: Fastening hole
w: Water level display window

What is claimed is:

1. A cooking appliance, comprising:
a cavity;
an electric chamber formed above the cavity;
a front panel installed in front of the cavity and closing a front of the electric chamber;
a water supply device disposed in the electric chamber and including a front surface exposed though the front panel; and
a guide that regulates a position of the water supply device with respect to the front panel, wherein the water supply device comprises:
a housing disposed in the electric chamber and forming an accommodating space; and
a water tank accommodated in the housing in a withdrawable manner, wherein the front surface is provided in front of the water tank, and wherein the water tank is detachably coupled to the housing so that a relative position of the front surface with respect to the housing in a lateral direction thereof is maintained.

2. The cooking appliance of claim 1, further comprising:
an opening defined in the front panel and including an opening hole that provides a passage between a front of the front panel and the electric chamber in a forward and rearward direction, wherein the front surface is exposed through the opening hole.

3. The cooking appliance of claim 2, wherein the guide comprises a first guide coupled to the water supply device, the first guide aligning a relative position of the front surface with respect to the guide.

4. The cooking appliance of claim 3, wherein the first guide comprises a front plate formed in a plane parallel to the front panel, and wherein the front plate is coupled to a front of the water supply device so that the relative position of the front surface with respect to the guide is aligned.

5. The cooking appliance of claim 4, wherein the opening hole further comprises a guide protrusion that protrudes rearward toward the electric chamber, and wherein the guide further comprises a second guide coupled to the guide protrusion to align the relative position of the guide with respect to the opening hole.

6. The cooking appliance of claim 5, wherein the second guide comprises a through-hole formed to pass through the front plate, and wherein the guide protrusion is fitted to the second guide through the through-hole so that the relative position of the guide with respect to the opening hole is aligned.

7. The cooking appliance of claim 6, wherein the guide protrusion has a shape corresponding to a shape of the opening hole and surrounds the opening hole at a rear thereof and protrudes rearward with respect to the front panel, and wherein an outer surface of the guide protrusion closely contacts an inner surface of the through-hole, and the guide protrusion and the second guide are fitted to each other.

8. The cooking appliance of claim 7, wherein the guide protrusion is formed by protruding a burr rearward of the front panel, which is formed during processing of the opening hole in the front panel.

9. The cooking appliance of claim 6, wherein the guide further comprises a fixer that fixes the guide to the cavity, the fixer comprising:
  a pair of side plates disposed at both lateral sides of the front plate and formed in a plane parallel to a side of the water supply device; and
  a bottom plate that provides a coupling surface between each of the side plates and the cavity.

10. The cooking appliance of claim 9, wherein the fixer comprises a third guide that guides a lateral coupling position between the first guide and the water supply device, and wherein the third guide comprises the pair of side plates spaced apart from each other at intervals corresponding to a lateral width of the water supply device.

11. The cooking appliance of claim 10, wherein the fixer further comprises a coupler coupled to the cavity, and wherein the coupler comprises the bottom plate coupled to an upper surface of the cavity.

12. The cooking appliance of claim 11, wherein the guide further comprises a fourth guide that guides a vertical coupling position between the first guide and the water supply device.

13. The cooking appliance of claim 12, wherein the fixer further comprises a support plate formed in a plane parallel to a bottom of the water supply device and disposed at a lateral inner side of the third guide, and wherein the fourth guide comprises the support plate.

14. The cooking appliance of claim 13, wherein the bottom plate is disposed at a lateral outer side of the third guide, and wherein the support plate is formed by bending a portion of the bottom plate inward in a lateral direction of the third guide.

15. The cooking appliance of claim 9, wherein the housing has a front portion facing the opening to be opened toward the opening.

16. The cooking appliance of claim 15, wherein the water tank is coupled to the housing so that the relative position of the front surface with respect to the housing is maintained constant in a vertical direction and the lateral direction thereof, and wherein the front portion of the housing is coupled to the front plate so that the water supply device and the first guide are coupled.

17. The cooking appliance of claim 15, wherein the housing is inserted into a space between the pair of the side plates so that a lateral coupling position with the first guide is guided.

18. The cooking appliance of claim 1, further comprising:
  an opening hole defined in the front panel that provides a passage between a front of the front panel and the electric chamber in a forward and rearward direction; and
  a guide protrusion that protrudes rearward toward the electric chamber from the opening hole, wherein the guide comprises:
  a first guide coupled to the water supply device to align a relative position of the front surface with respect to the guide; and
  a second guide coupled to the guide protrusion to align a relative position of the guide with respect to the opening, wherein the first guide is coupled to the water supply device so that the relative position of the front surface with respect to the guide is fixed at a first position, wherein the second guide is coupled to the guide protrusion so that the relative position of the guide with respect to the opening is fixed at a second position, and wherein the first position is configured such that a position of the front surface is guided to a set position inside of the opening when the guide is fixed at the second position.

19. A cooking appliance, comprising:
  a cavity;
  an electric chamber formed above the cavity;
  a front panel installed in front of the cavity and closing a front of the electric chamber;
  a water supply device disposed in the electric chamber and including a front surface exposed though the front panel; and
  a guide that regulates a position of the water supply device with respect to the front panel such that the front surface is fixed by the guide in a set position, both horizontally and vertically, with respect to the front panel, wherein the water supply device comprises:
  a housing disposed in the electric chamber and forming an accommodating space; and
  a water tank accommodated in the housing in a withdrawable manner, wherein the front surface provided in front of the water tank, and wherein the water tank is detachably coupled to the housing so that a relative position of the front surface with respect to the housing in a lateral direction thereof is maintained.

20. The cooking appliance of claim 1, further comprising:
  an opening defined in the front panel and including an opening hole that provides a passage between a front of the front panel and the electric chamber in a forward and rearward direction, wherein the front surface is exposed through the opening hole and is fixed in a set position with respect to the opening hole by the guide, both horizontally and vertically.

* * * * *